United States Patent
Dunn et al.

[11] Patent Number: 5,826,047
[45] Date of Patent: Oct. 20, 1998

[54] METHOD AND APPARATUS FOR EXTERNAL VIEWING OF AN INTERNAL BUS

[75] Inventors: John Philip Dunn; Theo C. Freund; Tony Tong-Khay Cheng, all of Austin, Tex.

[73] Assignee: Motorola, Inc., Schaumburg, Ill.

[21] Appl. No.: 703,252

[22] Filed: Aug. 26, 1996

[51] Int. Cl.⁶ ............................................. G06F 9/00
[52] U.S. Cl. ..................... 395/309; 395/308; 395/306; 371/22.1
[58] Field of Search ............................ 395/308, 871, 395/568, 183.06, 306, 309; 371/22.1, 183.01, 183.03

[56] References Cited

U.S. PATENT DOCUMENTS 5,675,749  10/1997  Hartvigsen et al. ............... 395/308

*Primary Examiner*—Meng-Ai T. An
*Assistant Examiner*—Rupal D. Dharia
*Attorney, Agent, or Firm*—Keith E. Witek

[57] ABSTRACT

A method and apparatus for viewing the contents of an internal bus (112) external to a integrated circuit (100) begins by providing a integrated circuit (100) which has the internal bus (112). Internal bus is not itself accessible to the external terminals of the integrated circuit (100). When an access on the bus (112) needs to be viewed external to the integrated circuit (100), a control section (120) forces the signals/access on the bus (112) to a second slower bus (114) within the integrated circuit (100). The second bus is coupled to circuitry (160) which is coupled to external terminals so that the external terminals can be used to inspect the contents of the bus (112) by using the bus (114) as an intermediary.

24 Claims, 4 Drawing Sheets

METHOD AND APPARATUS FOR EXTERNAL VIEWING OF AN INTERNAL BUS

FIELD OF THE INVENTION

The invention generally relates to electrical system design, and more specifically to circuitry for observing an internal integrated circuit (IC) bus on an existing external bus from within the IC.

BACKGROUND OF THE INVENTION

In the semiconductor arts, it is known that microprocessor units (MPU) have internal buses for the transmitting of data, address information, and control information. Often it is desirable for the states of the internal buses to be reviewed externally to the MPU. Traditionally this is accomplished by providing external pins either directly or multiplexed, for transmitting the internal bus data to an external source. A problem with this technique occurs with many modern MPUs, in that as the number of internal buses and control signals increase, the number of input/output (I/O) pins needed to view the internal states of desired buses must increase. The number of pins required may not be physically realizable on any practical package which can be used to encapsulate the integrated circuit. The number of pins required may also adversely impact the cost of the system of which the integrated circuit is a component. Therefore, it would be desirable to view, external to the integrated circuit, multiple internal buses, without increasing the number of pins needed external to the integrated circuit.

DETAILED DESCRIPTION OF THE INVENTION

In general, the present invention allows a central processing unit (CPU) to initiate a fast access bus request to a memory control section in order to access on-chip memory. In response to the fast access bus request, a control section uses one or more compare registers to provide one or more compare addresses. The one or more compare addresses are compared to the actual fast access bus (FAB) address. If the requested FAB address resides within the boundaries of the compare register, the control section will not respond with an address acknowledge signal (FAACK) to the CPU (e.g. a control signal will be asserted which will block the assertion of the FAACK). In response to not receiving a valid address acknowledge signal (FAACK), the CPU will attempt to access the desired address location through an alternate bus referred to as the inter-module bus (IMB). The alternate bus can be viewed externally to the microprocessor 100, thereby giving users observability of the access information. This information would normally be provided over the fast access bus (FAB) since the fast access bus (FAB) is not observable directly to a user external to the integrated circuit 100.

First, the interconnectivity of FIGS. 1–2 will be discussed, followed by the functional operation of the devices represented in the FIGURES.

Figure 1:
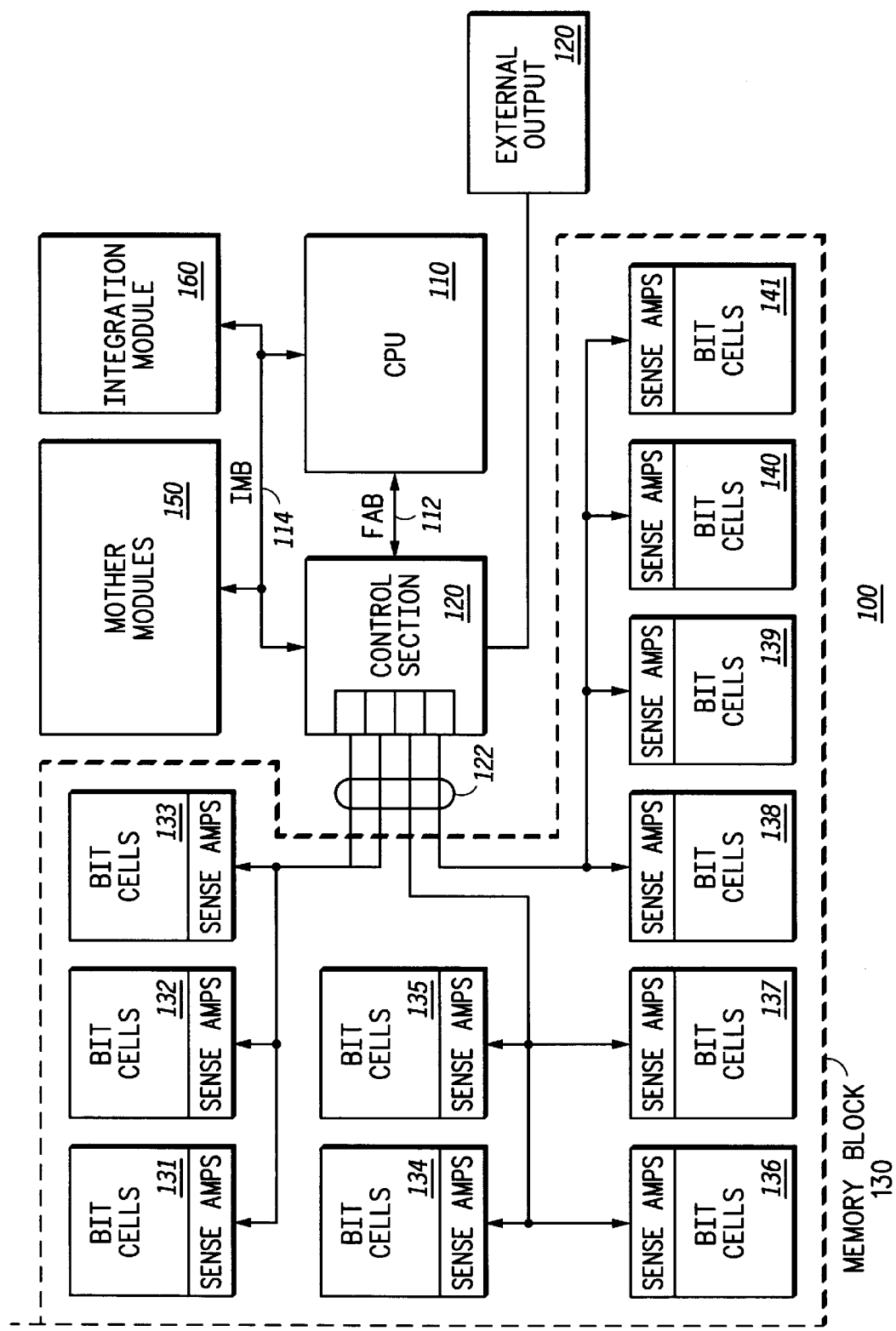
FIG. 1 illustrates, in a block diagram form, a system 100 in accordance with the present invention.

Regarding connectivity, FIG. 1 illustrates a microprocessor or integrated circuit (IC) 100. Microprocessor 100 comprises a CPU 110, a control section 120, a memory block 130, other modules 150, an integration module 160, an external output 170, an inter-module bus (IMB) 114, a fast access bus (FAB) 112, and a memory bus 122. The CPU 110 is connected to the FAB control section 112. Additionally, CPU 110 is connected to the integration module 160, other modules 150, and the control section 120 through the inter-module bus (IMB) bus. The control section is coupled via a memory bus 122 to the memory block 130, and to the external output 170. The memory block 130 includes a plurality of separate bit cell blocks 131–141.

Figure 2:
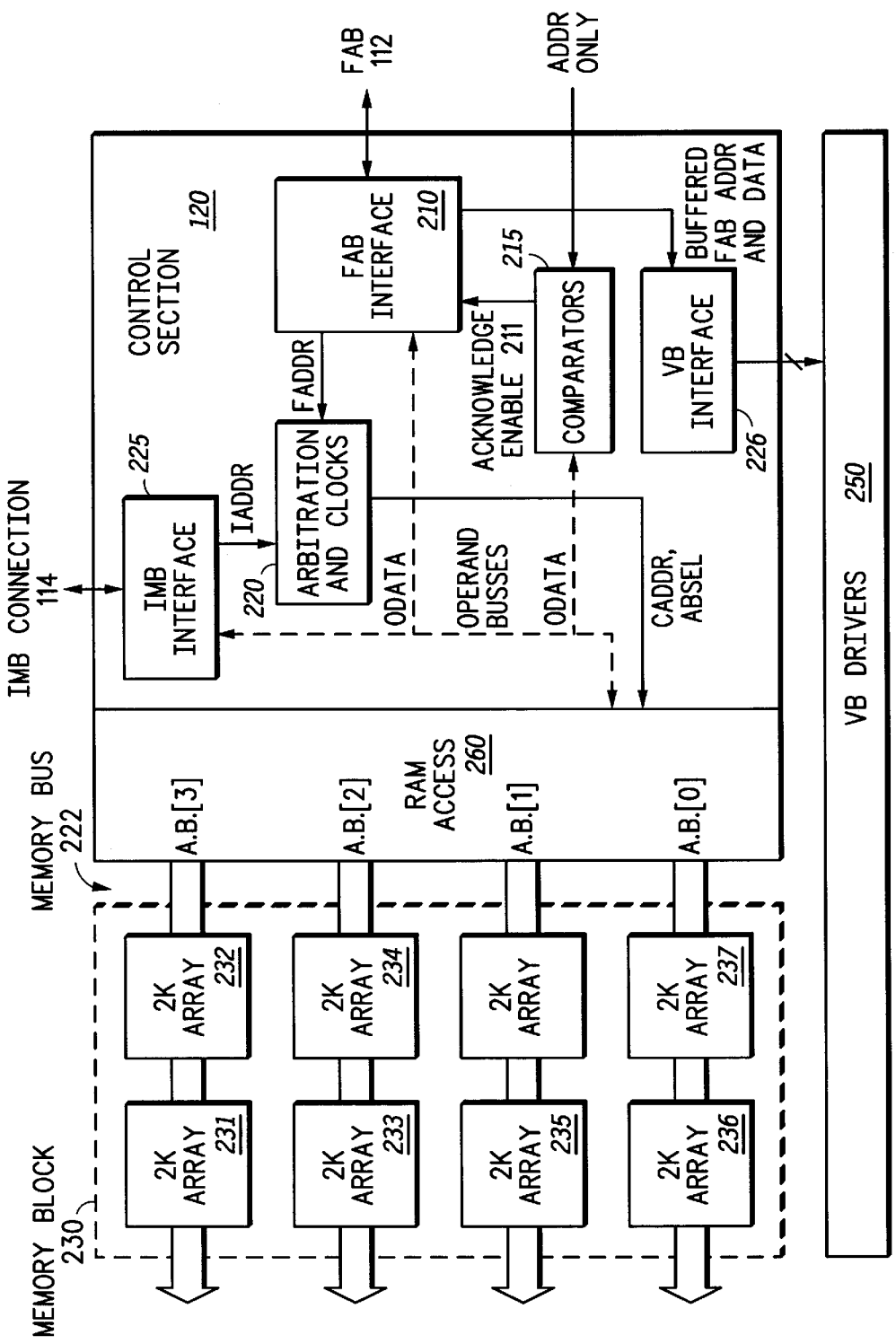
FIG. 2 illustrates, in block diagram form, a system portion 200 of the system 100, including a detailed view of control section 120.

FIG. 2 illustrates the portion 200 of microprocessor 100. The portion 200 includes a detailed view of control section 120, and memory block 230, which corresponds to memory block 130 of FIG. 1, and visibility bus drivers 250 which in turn would be a portion of the external output 170 of FIG. 1. The control section 120 has a fast access bus (FAB) interface 210, an arbitration and clocks section 220, an IMB interface section 225, comparators 215, a visibility bus (VB) interface 226, and a random access memory (RAM) access section 260. A buffered FAB address and data bus is provided by the FAB interface 210 and received by comparators 215 and visibility bus (VB) interface 226. A fast access bus address (FADDR) is provided by FAB interface 210 and connected to arbitration/clocks section 220. A bi-directional bus is connected between FAB interface 210, inter-module bus (IMB) interface 225, comparators 215, and RAM access 260. An operand bus address (CADDR) bus and array bus select (ABSEL) are output from the section 220 to access internal memory 230.

Figure 3:
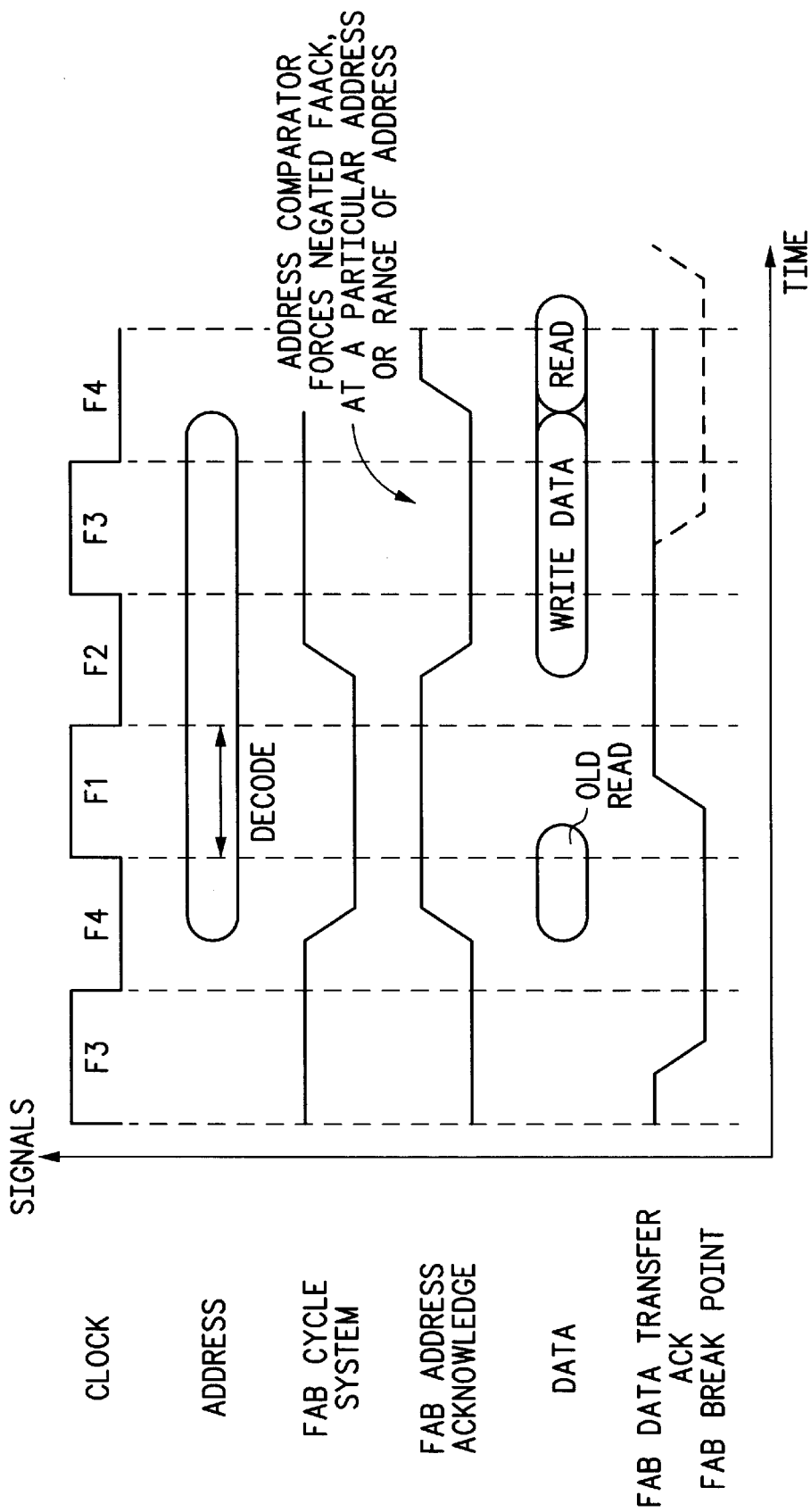
FIG. 3 illustrates a timing diagram in accordance with the present invention.

FIG. 3 illustrates a timing diagram relationship between the FAB 112 and the control section 120.

Figure 4:
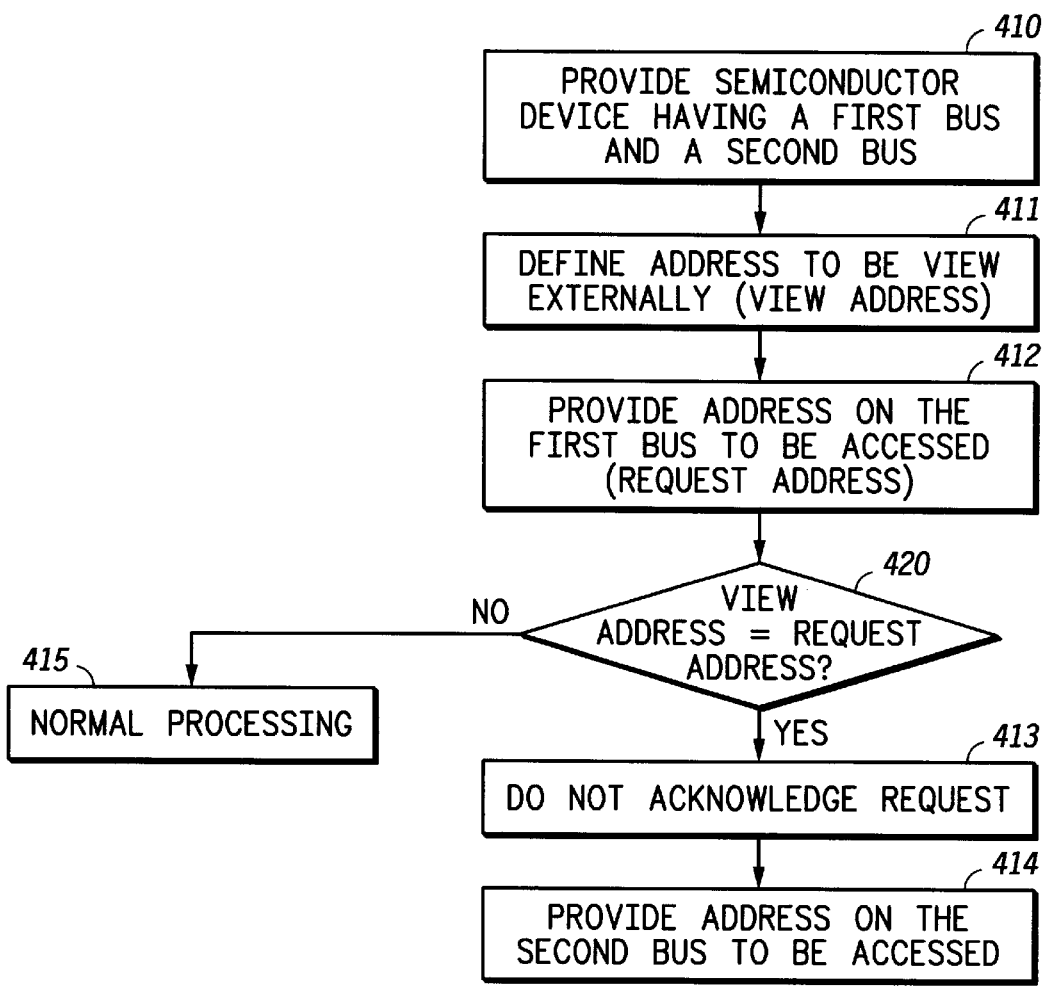
FIG. 4 illustrates a flow diagram representing a method 400 in accordance with the present invention.

FIG. 4 illustrates a flow diagram of a method 400. The flow diagram comprises rectangular action blocks 410–415, and a diamond shaped decision block 420.

In operation, the CPU 110 of FIG. 1 can initialize and access the control module section 120, integration module 160 or other modules 150, through the inter-module bus (IMB) 114. In addition, the CPU 110 can access the control section 120 through the fast access bus (FAB) 112. By providing a separate FAB 112, the CPU is able to access memory block 130, through a control section 120, at a faster rate. The faster rate is supported by a bus clock which in a preferred embodiment is twice that of the bus clock associated with the IMB 114. Additional throughput is possible in the system of FIGS. 1 and 2 since FAB 112 memory accesses can be performed in parallel to instruction fetches on the IMB 114.

During a normal memory block 130 access cycle the CPU 110 initiates the access via the FAB 112. The control section 120 which receives the FAB 112 determines whether or not the FAB address is a valid address in memory block 130. When an address is identified in the memory block 130 as being a valid address, the control section responds to the CPU 110 by sending an active FAB address acknowledge signal which is part of the FAB 112. This indicates to the CPU that the FAB address is valid. As such, the read or write access to the memory block 130 proceeds in a traditional fashion with the CPU either reading or writing data, with the cycle concluding when a transfer acknowledge signal is sent by the control block 120.

During a viewable memory block access cycle, the control section 120 does not assert an address acknowledge signal. As a result, the CPU 110 will attempt the same access on the IMB 114. Since the IMB is observable outside the microprocessor 100, the access which would normally occur on the FAB 112 is rerouted to the IMB 114, and becomes externally observable outside the packaged integrated circuit 100.

FIG. 2 illustrates in more detail the control section 120. The FAB 112 is received by the FAB interface portion 210 of the control section 120. FAB interface block 210 provides the address received from the FAB to the comparator portion 215. Comparator portion 215 includes a comparator register for storing an address or address block to be viewed on the IMB 114. When the value stored in the comparator register portion of the comparator 215 matches the current address on the FAB 112, the acknowledge enable signal 211 is not asserted. When the FAB interface portion 210 does not respond to the CPU 110 with an asserted address acknowledge signal, the CPU 110 is notified that the FAB did not acknowledge the request.

When an address is identified as invalid by the control section 120 through the FAB 112, the CPU 110 will attempt the exact same access on the IMB 114. The IMB 114 access to the control section 120 occurs through the IMB interface portion 225. The IMB interface portion 225 will process the data request rejected by the FAB 112. In the event that the memory location being accessed truly does not exist in the memory block 130, the IMB interface portion will not send a valid address acknowledge signal. However, in the event where the comparator registers associated with the FAB interface 210 blocked the FAB 112 request, the IMB interface 225 will access the desired location and present it to the IMB 114. By redirecting the access being attempted over the FAB to the inter-modular bus 114, the data access which would normally occur on the FAB is observable external to the microprocessor 100 without the need of additional input/output resources.

In an alternative embodiment of the present invention it may be desirable to have the option to actually pin out the fast address bus directly. A visiblility bus (VB) interface 226, is illustrated in FIG. 2. The VB interface 226 receives the FAB address and data information from the interface block 210. This information is provided directly to visibility bus (VB) drivers 250. VB drivers 250 provide the information to external pins, serially or in parallel, such that the FAB 112 is observed external to microprocessor 100. Generally, this will entail driving a parallel bus. Note that the combination of using the VB interface 226 and the comparator block 215 in order to disable the FAB offers a flexible solution. The first being where it is desirable to view the FAB address bus working at its full clock speed external to the part that may be accomplished through the VB interface 226. However, in a situation where extra pins are not available for external viewing, it is possible to redirect the FAB address bus contents to the IMB 114 by masking out an acknowledge signal (FAACK) when the address of the access on the FAB is within a certain constraint (equal to a specific address or within a defined address range).

FIG. 3 illustrates the common relationship among the signals associated with FAB 112. The clock signal shows a number of cycles of the FAB clock 112. Note that the cycle representation for the clock signal begins at cycle F3 of the previous access cycle. The previous bus cycle was a read cycle as indicated by the data signal. At cycle F3 of the previous memory access the FAB data transfer acknowledge signal is driven active during cycle F3 by the FAB interface 210. This indicates that the data to be read by the CPU either has been or is in the process of being transferred to the FAB 112. During cycle F4 of the previous bus access the CPU 110 drives a new address to the address bus and asserts the FAB cycle start signal (FCYS). Also during cycle F4 of the previous access, the FAB address acknowledge signal is de-asserted by the FAB interface 210. During the rising edge of current cycle F1, the address information is received by the control section 120, and the data from the prior access is read by the CPU 110. During cycle F1, the address received by the control section is decoded. During cycle F2 of the current access, the FCYS signal is de-asserted, and in the event where the comparator portion 215 of the control section 120 identifies a match between the comparator register and the address provided by the CPU, the FAB address acknowledge signal remains deasserted as indicated by the highlighted line of FIG. 3. Note that if the compare had not been valid it would indicate a normal bus cycle and the FAB address acknowledge signal would have been asserted during cycle F2.

For a write cycle, the CPU would present the write data on the address bus during cycle F2. In the timing diagram of FIG. 3, during the cycle F3, no transitions take place, as the FAB data transfer acknowledge signal has been disabled because of the compare registers matched the FAB address. Upon completion of the current cycle, the CPU would recognize that an invalid access attempt has occurred over the FAB, and a similar attempt would be made over the inter-module bus (IMB) 114. During the IMB access 114, a successful access, albeit at a lower bus speed, would occur allowing observability of the FAB.

The FAB data transfer acknowledge signal (FDTACK) and a fast access bus break point (FBKPT) (see FIG. 3) may also be used to inspect internal contents of memory. However, breakpoints tend to be more performance inhibiting than the FAACK denial mechanism taught herein. For the breakpoint function, the comparators contained within block 215 perform a compare function which identifies a break point location which is related to a given address. Since these comparators are already present in order to do breakpoint operations, the additional functionality of disabling the FAB (by denying FAACK) when attempting to observe accesses to a memory portion does not require additional hardware, as the breakpoint comparators double for this function.

FIG. 4 illustrates a method 400 in accordance with the present invention. During a first step 410, a semiconductor device having a first bus and a second bus is provided. The first bus would be analogous to the fast access bus, and the second bus would be analogous to the IMB 114. Next, at step 411, the address to be viewed externally is defined. This would be analogous to storing in the registers of comparator section 215, the address or addresses desired to be viewed external. These stored addresses are compared to the FAB address. Next, at step 412, an address request is placed on the first bus. The addresses on the first bus is part of an overall memory block 130 cycle. Next, during a step 420, it is determined whether or not the view address, which is stored in the registers of comparator block 215, matches the requested address, as provided on the first bus in step 412. In the event no match occurs, normal processing continues at a step 415. However, if a match does occur at step 420, processing continues at block 413. At block 413 the request is not acknowledged. This is analogous to the FAB address acknowledge signal not being asserted during cycle F2. Next, at step 414, the address of step 411 is provided to the second bus to define memory access. This occurs following step 413 when the CPU 110 recognizes that the fast access bus 112 request was not acknowledged. This access of the second bus in one embodiment would occur over the inter-module bus (IMB) 114.

While the present invention has been illustrated and described with reference to specific embodiments, further modifications and improvements will occur to those skilled in the art. For example, multiple enable signals may replace a single enable signal. Bus widths can be varied (e.g., 16 bit bus, 24 bit bus, 32 bit bus, 64 bit bus, etc.). Any type of memory (e.g., DRAM, SRAM, EEPROM, flash, ferroelectric, any combination thereof, etc.) and any configuration of memory (e.g. ten 2K blocks, three 32K blocks, five 16K blocks, etc.) can be used within the memory block 130. CPU 110 can be a pipelined or superscalar CPU or a plurality of individual CPUs. It is to be understood, therefore, that this invention is not limited to the particular forms illustrated and that it is intended in the appended claims to cover all modifications that do not depart from the spirit and scope of this invention.

We claim:

1. A method for viewing an internal bus access on an external bus coupled to an integrated circuit (IC), the method comprising the steps of:

(a) writing at least one comparator address to a register location within a control section of the integrated circuit;

(b) instructing a central processing unit (CPU) within the integrated circuit (IC) to begin a bus access using a fast access bus (FAB) within the integrate circuit (IC), the bus access using an access address;

(c) comparing the access address from step (b) to the at least one comparator address to see if the access address is a selected address;

(d) asserting a control signal when the access address is a selected address in step (c);

(e) preventing the bus access from occurring on the fast access bus (FAB) when the control signal in step (d) is asserted; and (f) performing the bus access of step (b) using the inter-module bus (IMB) instead of the fast access bus (FAB) in response to the assertion of the control signal in step (d).

2. The method of claim 1 further comprising the step of:

externally viewing the bus access external to the integrated circuit (IC) when the bus access is performed on the inter-module bus (IMB) in response to the assertion of the control signal in step (d).

3. The method of claim 1 wherein the step (a) further comprises:

writing at least two comparator addresses as the at least one comparator address where the at least two comparator addresses define a range of addresses wherein the control signal is asserted if the access address is within the range of addresses.

4. The method of claim 1 wherein the step (a) further comprises:

writing the at least one comparator address wherein the at least one comparator address is user-programmable.

5. The method of claim 1 wherein the step (a) further comprises:

writing, in addition to the at least one comparator address, further values which indicate whether the bus access is to be performed as a read and/or write operation in order for the control signal to be asserted in a step (d).

6. The method of claim 1 wherein the step (a) further comprises:

writing, in addition to the at least one comparator address, further values which indicate whether the bus access is to be performed in a user mode or in a supervisor mode in order for the control signal to be asserted in a step (d).

7. An integrated circuit (IC) comprising:

a central processing unit (CPU);

memory internal to the integrated circuit;

a control section having a inter-module bus (IMB) coupled between the control section and the CPU, the control section also having a fast access bus (FAB) between the control section and the CPU, the control section further comprising:

a fast access bus (FAB) interface circuit for interfacing the fast access bus (FAB) to the memory internal to the integrated circuit;

an inter-module bus (IMB) interface circuit for interfacing the inter-module bus (IMB) to the memory internal to the integrated circuit;

a comparator circuit for comparing a fast access bus (FAB) address to at least one selected address, the comparator circuit providing a control signal when a condition between the fast access bus (FAB) address and the at least one selected address is determined;

external interface circuitry coupled to the IMB and located internal to the integrated circuit (IC) which allows for external visibility of transactions occurring on the IMB; and wherein an access which is initiated using the fast access bus (FAB) is preempted by the control signal from the comparator circuit so that the access occurs using the inter-module bus (IMB) whereby the access is available external to the integrated circuit (IC) via the external interface circuitry.

8. The integrated circuit of claim 7 further comprising:

a visibility bus (VB) output from the control section for providing the access occurring on the fast access bus (FAB) to external pins of the integrated circuit, the external pins not being associated the inter-module bus (IMB).

9. The integrated circuit of claim 8 wherein the visibility bus (VB) is utilized only when an acknowledge control signal (FAACK) is asserted from the fast access bus (FAB) interface circuit.

10. The integrated circuit of claim 7 wherein the assertion of the control signal is a function of whether the access is a read or write operation.

11. The integrated circuit of claim 7 wherein the assertion of the control signal is a function of whether the access is a user mode access or a supervisory mode access.

12. The integrated circuit of claim 7 wherein the at least one selected address is a plurality of addresses that define an address range wherein the control signal is asserted if an address associated with the access is within the address range.

13. The integrated circuit of claim 7 wherein the control signal is asserted if the at least one selected address is equal to an address associated with the access.

14. The integrated circuit of claim 7 wherein the fast access bus (FAB) operates at a speed that is greater than the inter-module bus (IMB).

15. The integrated circuit of claim 7 wherein the inter-module bus (IMB) is coupled to an interface module which allows the inter-module bus to communicate via external pins of the integrated circuit (IC) to an environment external to the integrated circuit (IC).

16. The integrated circuit of claim 7 wherein the at least one selected address is user-programmable via the user executing a computer instruction within the central processing unit (CPU).

17. The integrated circuit of claim 7 wherein the assertion of the control signal preempts a fast access acknowledge signal (FAACK) from being asserted in order to allow the access to be viewed external to the integrated circuit (IC) using the inter-module bus (IMB).

18. A control circuit located within an integrated circuit (IC), the control circuit comprising:

a first bus connection coupled to a fast access bus (FAB);

a second bus connection coupled to a inter-module bus (IMB), the IMB being coupled to external terminals of the integrated circuit;

a fast access bus (FAB) interface circuit for interfacing the fast access bus (FAB) to resources internal to the integrated circuit;

an inter-module bus (IMB) interface circuit for interfacing the inter-module bus (IMB) to the resources internal to the integrated circuit; and a comparator circuit for comparing a fast access bus (FAB) address to at least one selected address, the comparator circuit providing a control signal to the fast access bus (FAB) interface circuit when a condition between the fast access bus (FAB) address and the at least one selected address is determined, the assertion of the control signal preventing address acknowledge by the fast access bus (FAB) interface circuit so that an access which would otherwise occur on the fast access bus (FAB) is instead performed using the inter-module bus (IMB) so that the access can be viewed external to the integrated circuit (IC).

19. The control circuit of claim 18 wherein fast access bus (FAB) is a bi-directional bus.

20. The control circuit of claim 18 wherein inter-module bus (IMB) is a bi-directional bus.

21. The integrated circuit of claim 18 further comprising:

a visibility bus (VB) output from the fast access bus (FAB) interface circuit for providing the access occurring on the fast access bus (FAB) to external pins of the integrated circuit, the external pins not being associated the inter-module bus (IMB).

22. The integrated circuit of claim 18 further comprising:

an arbitration circuit coupled to both the fast access bus (FAB) interface circuit and the inter-module bus (IMB) interface circuit for scheduling conflicts between the fast access bus (FAB) and the inter-module bus (IMB).

23. The integrated circuit of claim 18 wherein the internal resources are memory arrays internal to the integrated circuit (IC).

24. A control circuit located within an integrated circuit (IC), the control circuit comprising:

a first bus connection coupled to a first bus;

a second bus connection coupled to a second bus, the second bus being coupled to external terminals of the integrated circuit;

a first bus interface circuit for interfacing the first bus to memory located internal to the integrated circuit (IC);

a second bus interface circuit for interfacing the second bus to the memory located internal to the integrated circuit; and a comparator circuit for comparing a first bus address to at least one selected address, the comparator circuit providing a control signal to the first bus interface circuit when a condition between the first bus address and the at least one selected address is determined, the assertion of the control signal preventing address acknowledge by the first bus interface circuit so that an access which would otherwise occur on the first bus is instead performed using the second bus so that the access can be viewed external to the integrated circuit (IC), wherein the first and second buses are bi-directional buses.

* * * * *